United States Patent
Keishima et al.

(10) Patent No.: US 8,426,782 B2
(45) Date of Patent: Apr. 23, 2013

(54) INDUCTION HEATING DEVICE

(75) Inventors: Toshihiro Keishima, Hyogo (JP); Akira Kataoka, Hyogo (JP); Hirofumi Nakakura, Osaka (JP); Izuo Hirota, Hyogo (JP)

(73) Assignee: Panasonic Corporation, Osaka (JP)

( * ) Notice: Subject to any disclaimer, the term of this patent is extended or adjusted under 35 U.S.C. 154(b) by 357 days.

(21) Appl. No.: 12/089,781

(22) PCT Filed: Nov. 8, 2006

(86) PCT No.: PCT/JP2006/322226
§ 371 (c)(1),
(2), (4) Date: Apr. 10, 2008

(87) PCT Pub. No.: WO2007/055218
PCT Pub. Date: May 18, 2007

(65) Prior Publication Data
US 2009/0134149 A1   May 28, 2009

(30) Foreign Application Priority Data
Nov. 14, 2005   (JP) .................................. 2005-328390

(51) Int. Cl.
*H05B 6/12* (2006.01)
*H05B 6/08* (2006.01)

(52) U.S. Cl.
USPC ............ 219/627; 219/626; 219/665; 219/667

(58) Field of Classification Search .................. 219/600, 219/627, 626, 667, 494, 647, 620, 460.1, 219/446.1, 448.11, 624, 625, 665; 126/37 A
See application file for complete search history.

(56) References Cited

U.S. PATENT DOCUMENTS

| | | | |
|---|---|---|---|
| 7,049,564 B2 | 5/2006 | Takada et al. | |
| 2003/0164370 A1* | 9/2003 | Aihara et al. | ................. 219/622 |
| 2005/0194375 A1* | 9/2005 | McWilliams | ............ 219/452.11 |
| 2005/0242088 A1 | 11/2005 | Takada et al. | |

FOREIGN PATENT DOCUMENTS

| | | |
|---|---|---|
| JP | 09-94170 | 4/1997 |
| JP | 09-148062 | 6/1997 |
| JP | 2000-277244 | 10/2000 |
| JP | 2003-092176 | 3/2003 |

(Continued)

OTHER PUBLICATIONS

International Search Report issued Feb. 13, 2007 in the International (PCT) Application of which the present application is the U.S. National Stage.

(Continued)

*Primary Examiner* — Henry Yuen
*Assistant Examiner* — Hung D Nguyen
(74) *Attorney, Agent, or Firm* — Wenderoth, Lind & Ponack, L.L.P.

(57) ABSTRACT

An induction heating device has an accurate sensing of the temperature of a to-be-heated object and is user-friendly. The induction heating device includes a sensor for sensing the temperature of the to-be-heated object and can carry out a heating operation only when it is determined that the to-be-heated object exists above the sensor. A display having a circular design and characters, for example, that shows the position of this sensor is provided on a top plate of the induction heating device.

25 Claims, 3 Drawing Sheets

FOREIGN PATENT DOCUMENTS

| | | | |
|---|---|---|---|
| JP | 2003100435 A | * | 4/2003 |
| JP | 2004-063196 | | 2/2004 |
| JP | 2004-095309 | | 3/2004 |
| JP | 2004-095331 | | 3/2004 |
| JP | 2004-111055 | | 4/2004 |
| JP | 2004-164882 | | 6/2004 |
| JP | 2004-335342 | | 11/2004 |
| JP | 2004-355962 | | 12/2004 |
| JP | 2005-26162 | | 1/2005 |
| JP | 2005-141962 | | 6/2005 |
| JP | 2005216501 A | * | 8/2005 |
| JP | 2005353362 A | * | 12/2005 |

OTHER PUBLICATIONS

Partial English translation of JP2004-95331A, (Mar. 25, 2004).

Partial English translation of JP2004-95309, (Mar. 25, 2004).

English language Translation of JP 2004-335342 having a publication date of Nov. 25, 2004.

English language Translation of JP 2004-355962 having a publication date of Dec. 16, 2004.

* cited by examiner

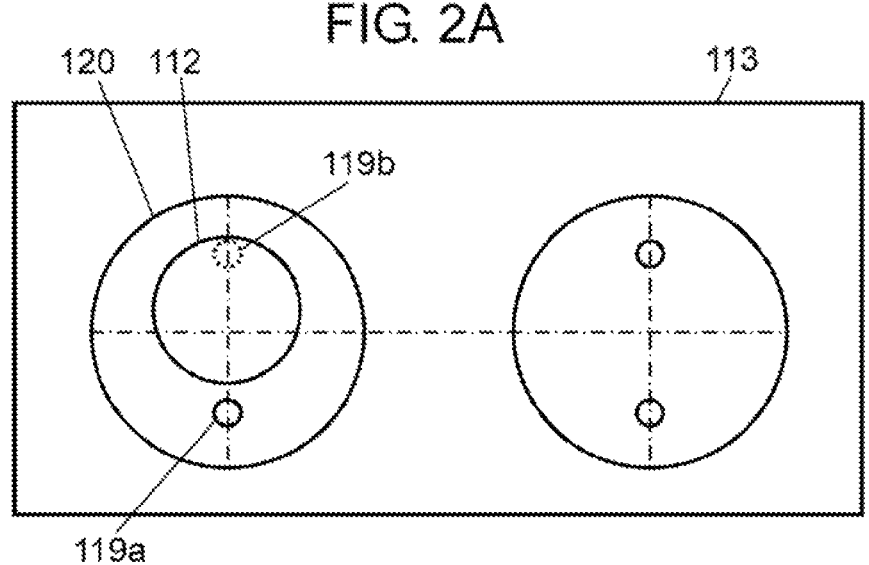
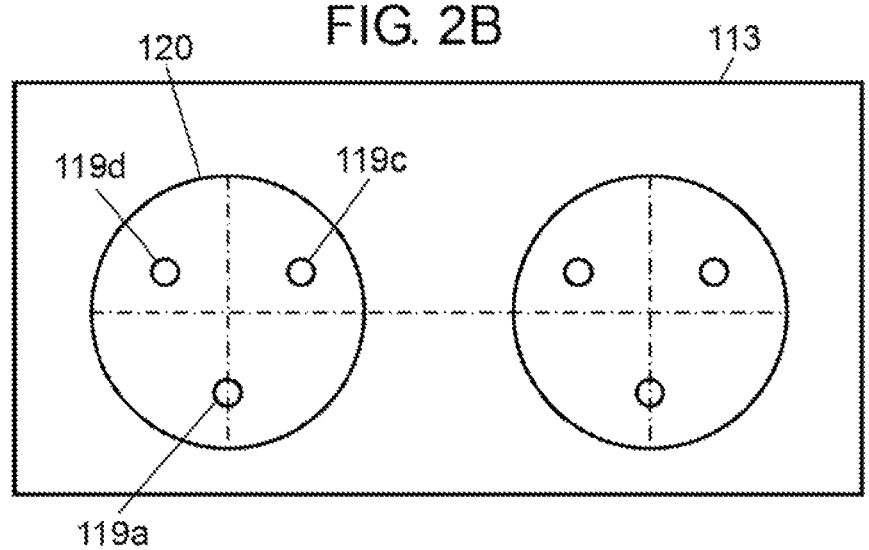
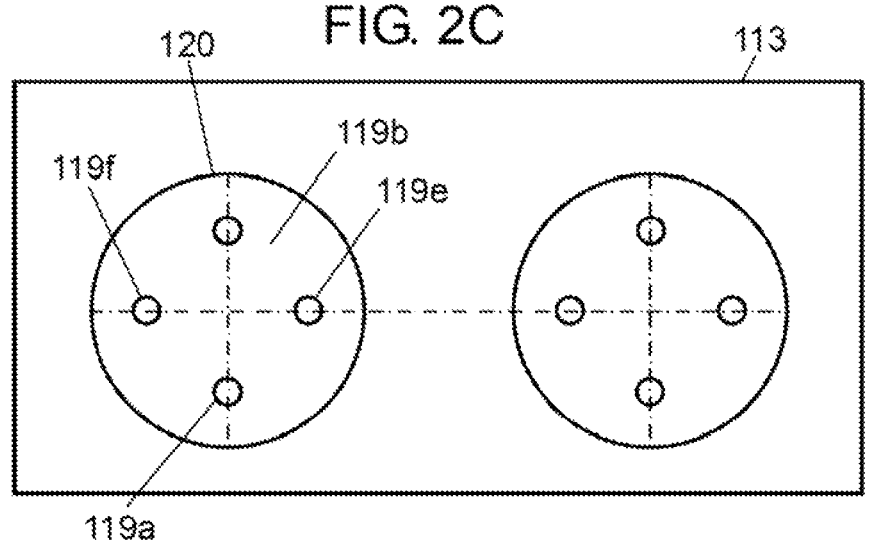

INDUCTION HEATING DEVICE

TECHNICAL FIELD

The present invention relates to an induction heating device in which the position of a sensor for sensing a temperature of a to-be-heated object placed on a top plate is decentered from the center of a heating coil and a display showing the position of the sensor is provided on the top plate.

BACKGROUND ART

Conventionally, this type of induction heating device is structured, as shown in FIG. 3 that is a vertical sectional view illustrating the induction heating device seen from the front side, a lower part of top plate 203 has heating coil 204 for induction-heating to-be-heated object 202.

Heating coil 204 is divided to inner coil 204a and outer coil 204b. An outer winding of inner coil 204a is electrically connected to an inner winding of outer coil 204b. Inner coil 204a and outer coil 204b are concentrically arranged when seen from the above of main body 201. The center of this concentric pattern corresponds to center 130 of circle 120 of FIG. 1B (which will be described later).

Sensors 205 are each a heat sensitive element such as a thermistor. Sensors 205 are provided at the center of heating coil 204 and at one position between inner coil 204a and outer coil 204b (a position closer to the left side of main body 201 of the induction heating device and a left-side position in FIG. 3). Sensor 205 is pressure-welded to a back face of top plate 203 corresponding to a lower part of to-be-heated object 202 and outputs a signal depending on a sensed temperature. The reason why the configuration as described above is used is that the temperature of to-be-heated object 202 can be generally sensed with a higher sensitivity by placing sensor 205 at a position causing a higher magnetic flux because sensor 205 placed at such a position can improve the uniform heating by the division of heating coil 204 and can prevent to-be-heated object 202 from having an excessively-increased temperature. Temperature calculator 206 senses the temperature of to-be-heated object 202. Temperature calculator 206 calculates the temperature of to-be-heated object 202 based on an output from sensor 205 that is a heat sensitive element. Based on the information obtained from temperature calculator 206, controller 207 controls the power supply to heating coil 204. The conventional induction heating device as described above is disclosed in Japanese Patent Unexamined Publication No. 2003-234168 for example.

In the case of the conventional configuration as described above however, thermal responsiveness and temperature sensing accuracy are deteriorated in a case where to-be-heated object 202 is not placed above sensor 205 when compared with a case where to-be-heated object 202 is placed above sensor 205. This has caused a disadvantage where, when to-be-heated object 202 such as a pan accommodating no food or liquid is heated while to-be-heated object 202 being not placed above sensor 205, the pan may be excessively heated to easily deform for example.

SUMMARY OF THE INVENTION

The present invention solves the above disadvantage of the conventional configuration. The present invention provides a user-friendly induction heating device that can prompt, in an easy-to-understand manner, a user to place to-be-heated object 202 at an appropriate position so that sensor 205 can be placed at a position at which the temperature of to-be-heated object 202 can be sensed with a high sensitivity and to-be-heated object 202 is securely placed on sensor 205 to sense the temperature of to-be-heated object 202 accurately.

In order to solve the above disadvantage of the conventional design, the induction heating device of the present invention includes a first sensor that is provided at a lower part of the top plate and that senses the temperature of a to-be-heated object. The first sensor is decentered from the center of the heating coil to a position closer to the front side of the main body of the induction heating device. The first sensor is provided at a position to sense the temperature of a part of the to-be-heated object having a higher temperature than that of the to-be-heated object above the center of the heating coil. A display unit showing the position of the first sensor is provided on the top plate. The one first sensor is provided. The display unit provided on the top plate that displays the position of a sensor for sensing the temperature of the to-be-heated object is only a display unit that shows the position of the first sensor.

The induction heating device of the present invention includes: a heating coil for heating a to-be-heated object, the heating coil being provided at a lower part of the top plate and is wound while being divided into an inner coil and an outer coil; and a first sensor for sensing the temperature of the to-be-heated object, the first sensor being provided at the lower part of the top plate between an inner coil and an outer coil. The first sensor is placed at a position closer to the front side of the main body of the induction heating device than to the center of the heating coil. The induction heating device of the present invention also includes a display showing the position of the first sensor that is provided on the top plate. The display unit provided on the top plate that displays the position of a sensor for sensing the temperature of the to-be-heated object is only a display unit that shows the position of the first sensor.

Through the configuration as described above, the temperature of a part of the to-be-heated object that has a higher temperature than that of a part corresponding to the center of the heating coil and that is decentered from the center can be sensed in a non-contact manner, thus improving the measurement accuracy of the temperature of the to-be-heated object. Furthermore, the position of the first sensor decentered from the center of the heating coil can be recognized by a user at a position in front of the to-be-heated object at which the user can easily visually recognize the to-be-heated object. This can make the user conscious of the importance of heating the to-be-heated object while the to-be-heated object is located above the first sensor, thus achieving a more accurate temperature sensing. This can prevent the to-be-heated object such as a pan from being abnormally heated or being deformed due to abnormal heating.

Furthermore, the induction heating device of the present invention has a structure as described below. Specifically, the first sensor that is provided at the lower part of the top plate and that senses the temperature of the to-be-heated object is decentered from the center of the heating coil in a direction vertical to the front side of the main body of the induction heating device so that the first sensor is decentered from the center of the heating coil to a position close to the front side. Thus, the first sensor is placed at a position to sense a part of the to-be-heated object that has a higher temperature than that of a part of the to-be-heated object above the center of the heating coil. A display unit showing the position of the first sensor is provided on the top plate with a reduced number of infrared ray sensors, thus reducing the cost.

Through the configuration as described above, a part of the to-be-heated object decentered from the center of the heating coil that has a higher temperature than that of a part corresponding to the center of the heating coil can be sensed. Furthermore, the position of the first sensor that is decentered from the center of the heating coil to a position close to the front side in a direction vertical to the front side of the main body can be sensed by the user at a position in front of the to-be-heated object at which the user can visually recognize the to-be-heated object most easily. This can make the user conscious of the importance of heating the to-be-heated object while the to-be-heated object is located above the first sensor, thus achieving a more accurate temperature sensing. This can prevent the to-be-heated object such as a pan from being abnormally heated or being deformed due to abnormal heating.

As described above, the induction heating device of the present invention can provide an accurate sensing of a temperature of the to-be-heated object, thus providing improved convenience to users.

BRIEF DESCRIPTION OF THE DRAWINGS

FIG. 2A is a plan view illustrating the first example of a top plate in Embodiment 2 of the present invention.

FIG. 2B is a plan view illustrating the second example of the top plate in Embodiment 2 of the present invention.

FIG. 2C is a plan view illustrating the third example of the top plate in Embodiment 2 of the present invention.

REFERENCE MARKS IN THE DRAWINGS

Figure 1A:
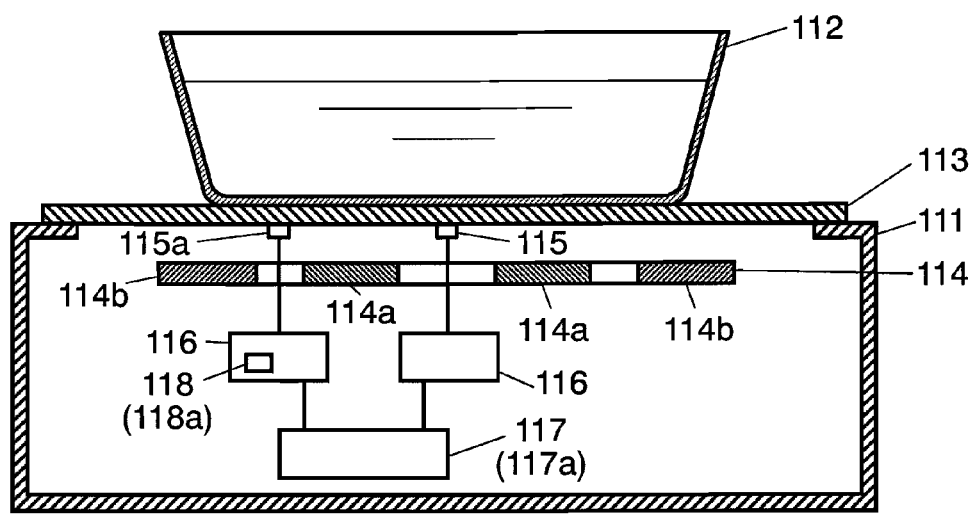
FIG. 1A is a cross-sectional view illustrating an induction heating device in Embodiment 1 of the present invention.

111 Main body
112 To-be-heated object
113 Top plate
114 Heating coil
115 Sensor
116 Temperature calculator
117 Controller
118 To-be-heated object determination section
119 display

DETAILED DESCRIPTION OF PREFERRED EMBODIMENTS

According to the first aspect of the invention, the induction heating device includes: a top plate that is provided on an upper face of a main body and that has thereon a to-be-heated object; a heating coil that is provided at a lower part of the top plate and that heats the to-be-heated object; a first sensor that is provided at the lower part of the top plate and that senses the temperature of the to-be-heated object; a temperature calculator that calculates a temperature of a bottom face of the to-be-heated object based on an output from the first sensor; and a controller that controls a power outputted to the heating coil in accordance with the output from the temperature calculator. The first sensor is decentered from the center of the heating coil to a position closer to the front side of a main body of the induction heating device. The first sensor is placed at a position to sense a higher temperature than that of a part of the to-be-heated object above the center of the heating coil. A display unit showing the position of the first sensor is provided on the top plate. The induction heating device has the one first sensor. The display unit provided on the top plate that displays the position of a sensor for sensing the temperature of the to-be-heated object is only a display unit that shows the position of the first sensor.

Through the configuration as described above, the position of the first sensor can be decentered from the center of the heating coil (e.g., between windings of the heating coil or in the vicinity of the inner circumference of the heating coil). Thus, the first sensor can be used to sense, in accordance with the temperature distribution of the to-be-heated object during an induction heating, a part of the to-be-heated object decentered from the center of the heating coil that has a higher temperature than that of the to-be-heated object above the center of the heating coil. Furthermore, the position of the first sensor decentered from the center of the heating coil can be easily recognized by the user in front of the to-be-heated object (because the user has a difficulty in recognizing the first sensor if the position of the first sensor is away from the user). Thus, the to-be-heated object can be securely placed above the first sensor, achieving a more accurate sensing of the temperature of the to-be-heated object. This can prevent the to-be-heated object such as a pan from being abnormally heated or being deformed due to abnormal heating.

According to the second aspect of the invention, the induction heating device includes: a top plate that is provided on an upper face of a main body and that has thereon a to-be-heated object, a heating coil for heating the to-be-heated object, the heating coil being provided at a lower part of the top plate and being wound while being divided into an inner coil and an outer coil; a first sensor for sensing the temperature of the to-be-heated object, the first sensor being provided between the inner coil and the outer coil at the lower part of the top plate; a temperature calculator for calculating the temperature of a bottom face of the to-be-heated object based on an output from the first sensor; and a controller for controlling the power outputted to the heating coil in accordance with the output from the temperature calculator. The first sensor is provided at a position decentered from the center of the heating coil to a position closer to the front side of a main body of the induction heating device. A display unit showing the position of the first sensor is provided on the top plate. The display unit provided on the top plate that displays the position of a sensor for sensing the temperature of the to-be-heated object is only a display unit that shows the position of the first sensor.

Through the configuration as described above, the position of the first sensor can be decentered from the center of the heating coil. Thus, the first sensor can be used to sense, in accordance with the temperature distribution of the to-be-heated object during an induction heating, a part of the to-be-heated object decentered from the center of the heating coil that has a higher temperature than that of the to-be-heated object above the center of the heating coil. Furthermore, the position of the first sensor decentered from the center of the heating coil can be easily recognized by the user in front of the to-be-heated object (because the user has a difficulty in recognizing the first sensor if the position of the first sensor is away from the user). Thus, the to-be-heated object can be securely placed above the first sensor, thus achieving a more accurate sensing of the temperature of the to-be-heated object. This can prevent the to-be-heated object such as a pan from being abnormally heated or being deformed due to abnormal heating.

According to the third aspect of the invention, the first sensor is provided at a position decentered from the center of the heating coil in a direction vertical to the front side. Through the configuration as described above, the high-temperature part of the to-be-heated part (a part having a high field intensity in a magnetic field distribution that has a similar shape as that of the heating coil and that includes distributed uniform field intensities) can be sensed at a position closest to the user. A display showing the position of the first sensor can be placed at the position closest to the user. Thus, when the user stands at the front side, the user can visually recognize the display showing the existence of the first sensor in an even easier manner. This can improve the convenience and can allow the display showing the position of the heating coil and the display showing the existence of the first sensor to be symmetrically formed with a similar shape, thus reducing the awkwardness in the design.

According to the fourth aspect of the invention, the top plate is made of infrared-transparent material and the first sensor is an infrared ray sensor for sensing the infrared ray that is emitted from the to-be-heated object that is transmissive through the top plate. Through the configuration as described above, the temperature of the to-be-heated object can be measured in a non-contact manner to improve the measurement accuracy of the temperature of the to-be-heated object thus providing a more accurate control of the temperature of the to-be-heated object.

According to the fifth aspect of the invention, the top plate is made of infrared-transparent material, and the first sensor is an infrared ray sensor for sensing the infrared ray that is emitted from the to-be-heated object and that is transmissive through the top plate and is close to the inner-most circumference of the heating coil. Through the configuration as described above, the temperature of a part of the to-be-heated object that tends to have an increasing temperature faster than that of the center of the heating coil can be measured in a non-contact manner to improve the measurement accuracy of the temperature of the to-be-heated object, thus providing the control of the temperature of the to-be-heated object with a higher accuracy.

According to the sixth aspect of the invention, the heating coil is divided into an inner coil and an outer coil, and the first sensor is provided between the inner coil and the outer coil. Through the configuration as described above, the temperature of a part of the to-be-heated object that tends to have an increasing temperature faster than that of the center of the heating coil can be measured in a non-contact manner to improve the measurement accuracy of the temperature of the to-be-heated object, thus providing the control of the temperature of the to-be-heated object with a higher accuracy.

According to the seventh aspect of the invention, the display unit is illuminated by light from a lower side. Through the configuration as described above, the user can visually recognize the position of the first sensor in a further easier manner. Thus, the user can visually recognize, even in a dark place, the first sensor covered by the to-be-heated object in a more secure manner.

According to the eighth aspect of the invention, the neighborhood of the display unit is illuminated by light from a lower side. Through the configuration as described above, the user can visually recognize the position of the first sensor in a further easier manner. Thus, the user can visually recognize, even in a dark place, the first sensor covered by the to-be-heated object in a more secure manner.

According to the ninth aspect of the invention, a heat sensitive element such as a thermistor is provided at the center of the heating coil. The temperature calculator calculates a temperature of a bottom face of the to-be-heated object based on output from the heat sensitive element. The controller controls the power outputted to the heating coil in accordance with the output from the temperature calculator. A display unit of a heat sensitive element of the thermistor is not provided. Through the configuration as described above, the user can recognize a position of the first sensor for which a probability of where the first sensor is placed on the heat sensitive element located at the center of the heating coil is lower than a probability of where the first sensor is not located on the heat sensitive element placed at the center of the heating coil. This can prompt the user to securely place the to-be-heated object above the first sensor. This can provide a more accurate temperature sensing, thus preventing the to-be-heated object such as a pan from being abnormally heated or being deformed due to abnormal heating.

According to the tenth aspect of the invention, the position of the display unit does not completely correspond to the position of the first sensor. The display unit is placed at a position decentered to the front side on the auxiliary line vertical to the front side passing the center of the heating coil. Through the configuration as described above, the conveniences are improved and a more preferable design can be obtained.

According to the eleventh aspect of the invention, a first a text display showing the existence of the sensor is provided in the vicinity of the front side of the display unit. Through the configuration as described above, the user can more clearly understand that the display showing the position of the sensor or the position of the first sensor must be covered by the to-be-heated object, thus allowing the resultant induction heating device to be user-friendly.

According to the twelfth aspect of the invention, a text display for prompting a user to cover the display showing the position of the first sensor by the to-be-heated object is provided on the top plate. Through the configuration as described above, the user can more clearly understand that the display showing the position of the sensor or the position of the first sensor must be covered by the to-be-heated object, thus allowing the resultant induction heating device to be user-friendly.

Hereinafter, embodiments of the present invention will be described with reference to the drawings. It is noted that the present invention is not limited to the embodiments.

Embodiment 1

FIG. 1A is a vertical sectional view illustrating an induction heating device in Embodiment 1 of the present invention seen from a side face. The left side face of FIG. 1A corresponds to the front side of the induction heating device (a side operated by a user).

It is noted that parts having no direct relation with the description of the present invention will not be shown or described in order to avoid confusion and this will be applied to the entire specification.

In FIG. 1A, an upper face of main body 111 of the induction heating device has thereon top plate 113 on which to-be-heated object 112 is placed. A lower part of top plate 113 has heating coil 114 for induction-heating to-be-heated object 112.

Heating coil 114 is divided to inner coils 114a and outer coils 114b. An outer winding of inner coil 114a is connected to an inner winding of outer coil 114b. Inner coil 114a and outer coil 114b are concentrically arranged when seen from the upper side of main body 111. The center of this concentric pattern corresponds to center 130 of circle 120 shown in FIG. 1B (which will be described later).

First sensor 115a and sensor 115 are each a heat sensitive element such as a thermistor. Sensor 115 is provided at the center of heating coil 114 (more particularly, at the upper side of the center and this will be applied the following description). First sensor 115a is provided between the windings of heating coil 114 (i.e., at a position of a space formed between inner coil 114a and outer coil 114b (a position of induction heating device main body 111 closer to the front side and closer to the left side in FIG. 1A)). First sensor 115a and sensor 115 are pressure-welded to a back face of top plate 113 having a contact with a bottom face of to-be-heated object 112 and output a signal depending on a sensed temperature. Temperature calculators 116 of to-be-heated object 112 calculate a temperature state based on the outputs from first sensor 115a and sensor 115. Controller 117 controls the power supply to heating coil 114 based on the information obtained from temperature calculator 116.

The induction heating device also includes to-be-heated object determination section 118 that determines whether to-be-heated object 112 exists above first sensor 115a or not. Controller 117 is designed to limit the operation for heating to-be-heated object 112 (e.g., to stop or suppress the output power) when to-be-heated object determination section 118 determines that to-be-heated object 112 does not exist above first sensor 115a. When to-be-heated object determination section 118 is of a contact-type, such as a thermistor, to-be-heated object determination section 118 makes this determination based on a slope between an initial temperature and a temperature rise and, when to-be-heated object determination section 118 is of the noncontact-type, such as an infrared ray sensor, a reference output voltage may be set to show that to-be-heated object 112 is placed above first sensor 115a. When an infrared ray sensor is used, the existence of light incidence in a room may be determined based on a path through which the infrared ray enters or the existence of light reflected from to-be-heated object 112 also may be determined when light enters the lower side of the path through which the infrared ray enters. In other words, any method may be used so long as a function can be used to determine the existence or nonexistence of to-be-heated object 112. In this embodiment, this function is provided to only first sensor 115a between inner coil 114a and outer coil 114b. The reason is that, when this function is provided to a sensor at a position at which heating coil 114 has the maximum magnetic flux or a magnetic flux higher than that of heating coil 114 and at a position at which the temperature of to-be-heated object 112 easily rises, the temperature of to-be-heated object 112 can be sensed with a high sensitivity and a probability to-be-heated object 112 is placed above first sensor 115a is higher than a probability to-be-heated object 112 is not placed above sensor 115 at the center of heating coil 114.

This function also can be provided to sensor 115 at the center.

Figure 1B:
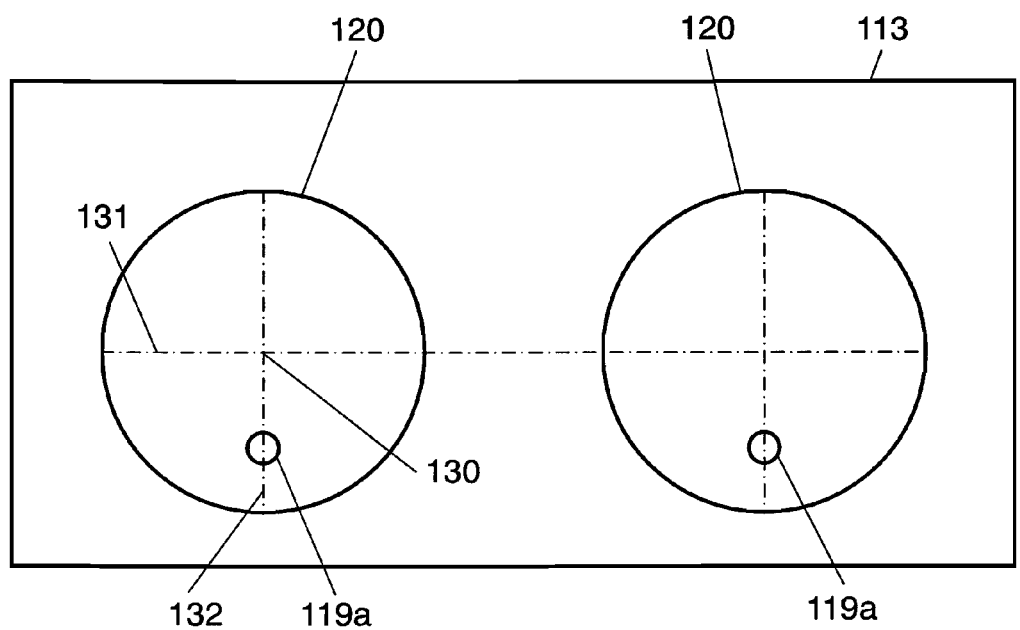
FIG. 1B is a plan view illustrating a top plate in Embodiment 1 of the present invention.
Figure 3:
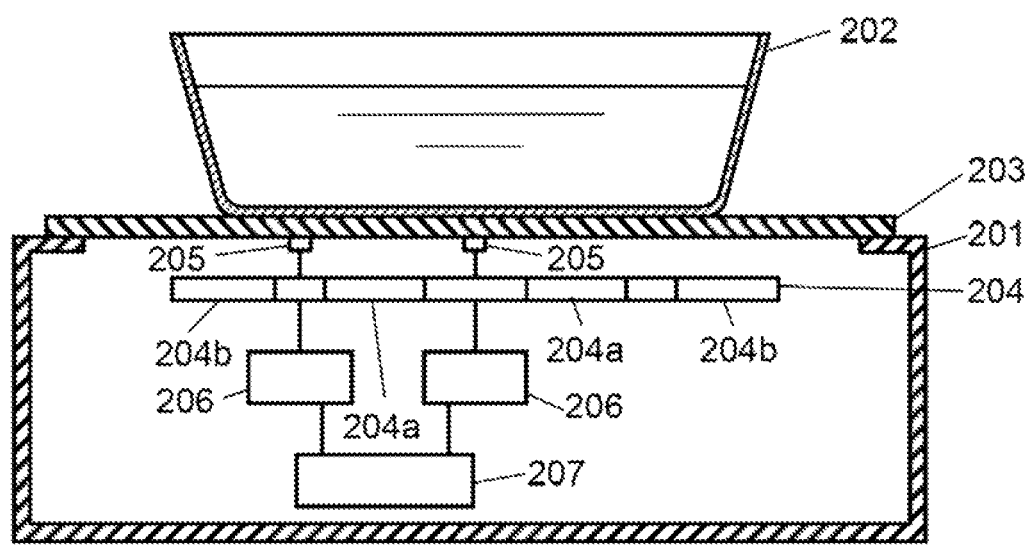
FIG. 3 is a cross-sectional view illustrating a conventional induction heating device.

FIG. 1B is a plan view illustrating the induction heating device in the first embodiment of the present invention when seen from above. The lower side of FIG. 1B corresponds to the front side of main body 111 of the induction heating device (a face at which the user carries out the operation). It is noted that this induction heating device is designed so that two heating coils 114 are arranged at left and right so that two to-be-heated objects 112 (e.g., two pans) can be simultaneously heated. In order to show the positions at which heating coils 114 are placed, two large circles 120 are drawn on top plate 113. At the lower side of two large circles 120, the induction heating device is provided that includes heating coils 114 arranged to be opposed to the back face of top plate 113. Heating coils 114 have an identical internal structure and have a vertical sectional view (a cross-sectional view that passes through center 130 of FIG. 1B and that is obtained when the induction heating device is cut along auxiliary line 132 vertical to the front side) as shown in FIG. 1A. Thus, the following section will describe only one heating coil 114 and a part corresponding to circle 120.

Circular display 119a is printed on one position in top plate 113 closer to the front side of main body 111 so that the position of first sensor 115a can be recognized by the user. Display 119a also may have a text display (not shown) in the vicinity thereof so that the user can recognize that first sensor 115a is placed under display 119a and display 119a is a display regarding first sensor 115a. Alternatively, a text display (not shown) for prompting the user to cover display 119a by the bottom face of to-be-heated object 112 also may be provided. The inner part of circular display 119a also may have a different color from the color of top plate 113 surrounding display 119a.

The following section will describe the operation and action of the induction heating device having the structure as described above.

The position of first sensor 115a can be decentered from center 130 of heating coil 114 and is closer to the inner side than to the outer periphery of heating coil 114 so that the temperature of to-be-heated object 112 having a high temperature part can be sensed. Display 119a showing the position of first sensor 115a that is provided on top plate 113 also allows the user to recognize the position of first sensor 115a. This can prompt the user to securely place to-be-heated object 112 above first sensor 115a. Thus, the temperature can be sensed more accurately, suppressing to-be-heated object 112 such as a pan from being abnormally heated or being deformed due to abnormal heating.

Furthermore, one first sensor 115a for deterring the existence or nonexistence of to-be-heated object 112 is provided at a position closer to the front side of main body 111 than to the center of heating coil 114. Thus, the user can easily see the position of the sensor displayed on the top plate 113 (because the user has a difficulty in recognizing the sensor if the user is away from the position of the sensor), thus allowing the resultant induction heating device to be user-friendly. Specifically, first sensor 115a is placed on auxiliary line 132 that passes through center 130 shown in FIG. 1B and that is vertical (perpendicular) to the front side and is decentered from center 130 of heating coil 114 to the front side of main body 111. As a result, first sensor 115a can sense a part of to-be-heated part 112 having a high temperature (a part having a high field intensity among field intensities distributed concentrically with heating coil) at a position closest to the user. By placing display 119a at the position closest to the user, the user can visually recognize, when standing at the front side, the display showing first sensor 115a in a further easier manner. As a result, the resultant induction heating device can be more user-friendly and display 120 showing the position of heating coil 114 and display 119a showing the position of first sensor 115a can be arranged almost in a symmetrical manner, thus reducing the awkwardness in the design and providing a more attractive design. Furthermore, since only first sensor 115a is provided that is decentered from the center of heating coil 114 and that can measure the high-temperature part of heating coil 114 (or that has a function to determine the existence or nonexistence of to-be-heated object 112), the cost in this case is minimized.

Although FIG. 1B illustrates first sensor 115a that is on auxiliary line 132 passing through center 130 and vertical to the front side and that is decentered from center 130 of heating coil 114 to the front side of main body 111, the position of first sensor 115a is not limited to this. First sensor 115a also may be provided at a position closer to the front side of main body 111 than to the center of heating coil 114 so that the user in front of the to-be-heated object can recognize display 119*a* showing the position of first sensor 115*a* (because the user has a difficulty in recognizing the first sensor if the position of the first sensor is away from the user). This allows the user to visually recognize display 119*a* in an easier manner, thus providing the same effect as that of the above configuration by which the resultant induction heating device can be more user-friendly.

Although display 119*a* has been shown with a circular shape, display 119*a* preferably has a design through which the position of first sensor 115*a* can be visually recognized in an easy manner. It is noted that the shape of display 119 is not limited to the circular one and also may be any shape (e.g., the elliptic one, the triangular one, the square one, or the combination thereof) so long as the user can determine the position of first sensor 115*a*.

Alternatively, a text display (not shown) (e.g., "sensor", "sensor position") also may be provided in the vicinity of display 119*a* at the front side so that the user can recognize the position of first sensor 115*a* more easily through both the shape and characters. Alternatively, top plate 113 also may have thereon a text display (not shown) to prompt the user to cover display 119*a* with the bottom face of to-be-heated object 112 so that the user can recognize the position of first sensor 115*a* in a further easier manner.

First sensor 115*a* decentered from the center of heating coil 114 to sense the temperature of to-be-heated object 112 also may be an infrared ray sensor that senses the infrared ray emitted from to-be-heated object 112. In this case, first sensor 115*a* as an infrared ray sensor improves the responsiveness in the temperature sensing and the accuracy in the determination of the existence or nonexistence of to-be-heated object 112, thus performing the sensing with a higher accuracy. However, when an infrared ray sensor is used as first sensor 115*a*, instead of having first sensor 115*a* in contact with top plate 113, a light guiding column (not shown) for guiding an infrared ray is vertically provided to extend from a position in the vicinity of the lower face of top plate 113 to a position equal to or lower than a position of the lower face of heating coil 114, for example, so that the infrared ray sensor can sense the existence in a non-contact manner while being away from top plate 113. Since the infrared ray sensor is particularly influenced by the infrared transparency performance of top plate 113, the inner part of circular display 119*a* may be printed with material having a superior transparency performance or may not be printed at all so that the existence or nonexistence of printing, the color of printing, or the shading of printing, for example, can be used to differentiate a part holding the infrared ray sensor from other positions to secure the sensing performance and to provide a further clearer recognition of display 119*a*.

When first sensor 115*a* is an infrared ray sensor, display unit 119*a* or the vicinity thereof also may be illuminated by light emitted from the lower side from a light source (e.g., LED) through the light guiding column or other light-guiding means. This allows the user to visually recognize the positions of display unit 119*a* and first sensor 115*a* in a further easier manner and to visually recognize, even in a dark place, how first sensor 115*a* is covered by to-be-heated object 112 in a more secure manner.

It is noted that the above embodiment may omit the function of to-be-heated object determination section 118. In this case, the user in front of to-be-heated object 112 also can easily recognize display 119*a* showing the position of first sensor 115*a* decentered from the center of heating coil 114, thus preventing the to-be-heated object such as a pan from being abnormally heated or being deformed due to abnormal heating.

It is noted that, although the above embodiment has divided heating coil 114 to place first sensor 115*a* between the windings in order to decenter first sensor 115*a* from the center of heating coil 114, heating coil 114 also may not be divided or may be divided so that first sensor 115*a* is provided closer to the winding at the inner-most circumference to decenter first sensor 115*a* and display 119*a* from the center of heating coil 114.

Embodiment 2

FIG. 2A, FIG. 2B, and FIG. 2C are plan views illustrating a top plate in Embodiment 2 of the present invention. FIG. 2A shows an example in which two sensors, first sensor 115*a* and second sensor 115*b*, are provided (and are provided to correspond to one heating coil 114, respectively hereinafter). FIG. 2B shows an example in which three sensors, first sensor 115*a* and second sensors 115*c* and 115*d*, are provided. FIG. 2C shows an example in which four sensors, first sensor 115*a*, second sensor 115*b*, and third sensors 115*e* and 115*f*, are provided.

In Embodiment 2, as shown in the respective drawings, sensors 115*a* to 115*f* are provided among the windings of heating coil 114 to sense the temperature of to-be-heated object 112. Sensors 115*a* to 115*f* are provided on a single circumference surrounding the center 130 of heating coils 114 so as to divide the circumference into equal circular arcs. First sensor 115*a*, at one of the equal circular arcs, is placed so as to be decentered from the center of heating coil 114 to the front side of main body 111 (in a direction orthogonal to the front side of main body 111). In FIG. 2A, FIG. 2B, and FIG. 2C, small circular displays 119*a* to 119*f* show the displays on top plate 113 showing the positions of two, three, or four sensors 115*a* to 115*f* and respectively function as displays showing the user that the respective corresponding sensors are provided under the respective displays.

As in Embodiment 1, two large circles 120 are drawn on top plate 113 in Embodiment 2 in order to show positions at which heating coils 114 are placed. The internal structure of the induction heating device including heating coils 114 opposed to two large circles 120 is the same as that of Embodiment 1. Thus, only one heating coil 114 and one circle 120 will be described hereinafter as in Embodiment 1.

In FIG. 2A, two displays, display 119*a* and display 119*b*, show the positions of sensors and are arranged so as to divide a single circumference surrounding the center of heating coil 114 (which corresponds to center 130 as an intersecting point at which auxiliary line 131 in parallel with the front side of main body 111 in FIG. 1B intersects with auxiliary line 132 vertical to the front side of main body 111) into equal circular arcs. In other words, display 119*a* showing the position of one first sensor 115*a* is drawn at a position decentered from the center of heating coil 114 to the front side of main body 111. Display 119*b* that is the other display showing the position of second sensor 115*a* is drawn at a position rotated 180 degrees from the position of display 119*a* (i.e., at the rear side of the center of heating coil 114).

In FIG. 2A, to-be-heated object determination section 118*a* and controller 117*a* corresponding to to-be-heated object determination section 118 and controller 117, respectively, shown in FIG. 1A of Embodiment 1 are different from those of Embodiment 1. Specifically, to-be-heated object determination section 118*a* senses whether to-be-heated object 112 is placed above first sensor 115*a* or not and senses whether to-be-heated object 112 is placed above second sensor 115b or not. Controller 117a limits, based on a signal outputted from to-be-heated object determination section 118a, an operation for heating to-be-heated object 112 (e.g., stops the heating or suppresses the output). Upon receiving a signal showing that no to-be-heated object 112 exists above first sensor 115a, controller 117a limits the heating operation. However, when controller 117a also receives a signal showing that to-be-heated object 112 exists above second sensor 115b, controller 117a cancels the limitation on the heating operation based on the determination that no to-be-heated object 112 exists above first sensor 115a to provide a normal heating operation.

In FIG. 2B, three displays 119a, 119c, and 119d show the positions of sensors and are arranged on a single circumference surrounding the center of heating coil 114 so as to divide the circumference to equal circular arcs. In other words, display 119a showing the position of one first sensor 115a is drawn at a position decentered from the center of heating coil 114 to the front side of main body 111. Display 119c showing the position of second sensor 115c is drawn at a position rotated 120 degrees from the front side in a counterclockwise direction. Display 119d showing the position of second sensor 115d is drawn at a position rotated 240 degrees from the front side in the counterclockwise direction.

FIG. 2B is different from FIG. 2A in that, when controller 117a receives a determination result from to-be-heated object determination section 118a showing that to-be-heated object 112 does not exist above first sensor 115a and when controller 117a receives a determination result showing that to-be-heated object 112 exists above any of second sensors 115b and 115c, controller 117a does not limit the heating operation based on the determination that to-be-heated object 112 does not exist above first sensor 115a.

In FIG. 2C, four displays 119a, 119b, 119e, and 119f show the positions of sensors and are arranged on a single circumference surrounding the center of heating coil 114 so as to divide the circumference to equal circular arcs. Specifically, display 119a showing one first sensor 115a is drawn at a position decentered from the center of heating coil 114 to the front side of main body 111. Display 119e showing the position of third sensor 115e is drawn at a position rotated 90 degrees from the front side in the counterclockwise direction. Display 119b showing the position of second sensor 115b is drawn at a position rotated 180 degrees from the front side in the counterclockwise direction. Display 119f showing the position of third sensor 115f is drawn at a position rotated 270 degrees from the front side in the counterclockwise direction. In other words, third sensors 115e and 115f are arranged to be decentered from the center of heating coil 114 in the lateral direction.

FIG. 2C is different from FIG. 2A in that, when controller 117a receives a determination result from to-be-heated object determination section 118a showing that to-be-heated object 112 does not exist above first sensor 115a and when controller 117a receives a determination showing that to-be-heated object 112 exists above at least any of second sensor 115b and third sensors 115e and 115f, controller 117a does not limit the heating operation based on the determination showing that the to-be-heated object 112 does not exist above first sensor 115a.

The following section will describe the operation and action of the induction heating device having the structure as described above.

First sensor 115a is provided at a position that is decentered from center 130 of heating coil 114 and that is at the inner side of the outer periphery of heating coil 114. Thus, first sensor 115a can sense the temperature of a high-temperature part of to-be-heated object 112. One first sensor 115a is decentered from the center of heating coil 114 to the front side of main body 111. This allows the user to easily see display 119a showing the position of the first sensor located on top plate 113. Thanks to the existence of the plurality of sensors of second sensor 115b and third sensors 115e and 115f, even when to-be-heated object 112 shown in FIG. 2A for example is placed at a position dislocated from the center of heating coil 114 to the rear side (to the upper side in FIG. 2A), to-be-heated object 112 can be placed above sensor 115b at the inner side so that the temperature of to-be-heated object 112 can be detected. This reduces the probability that the user carries out a heating operation when to-be-heated object 112 does not exist above any of first sensor 115a and second sensor 115b.

Since the configurations shown in FIG. 2B and FIG. 2C have a greater number of sensors than that of FIG. 2A, the probability is further reduced that the heating operation is carried out when to-be-heated object 112 is not placed above any of the sensors.

Controller 117 limits the heating operation when to-be-heated object 112 is not placed above any of the sensors. This can suppress to-be-heated object 112 such as a pan from being abnormally heated or being deformed due to abnormal heating and also reduces the probability that to-be-heated object 112 is not placed on any of the sensors and thus to-be-heated object 112 cannot be heated, thus allowing the resultant induction heating device to be user-friendly.

It is noted that displays 119a to 119f are not always required to be drawn at positions on an accurate circumference and are also not always required to be arranged so as to accurately divide a circumference to equal circular arcs. For example, displays 119a to 119f may include an error caused by a problem due to a manufacture step or caused by a variation among components. Displays 119a to 119f are also not always required to be on an accurate circumference due to a design configuration, layout, design or other related reasons and are not always required to be arranged so as to divide a circumference to equal circular arcs.

Furthermore, the positions of sensors 115a to 115f do not have to completely correspond to the positions at which displays 119a to 119f are drawn. For example, when first sensor 115a is provided at a position dislocated from auxiliary line 132 that passes center 130 of the heating coil and that is vertical to the front side, one display 119a on top plate 113 is preferably drawn at a position on auxiliary line 132 decentered from the front side because this position provides improved convenience and design. However, when display 119a is excessively dislocated from sensor 115a, the design must be reconsidered because this case may cause a determination showing that to-be-heated object 112 does not exist above sensor 115a even when to-be-heated object 112 is actually placed on display 119a, thus preventing to-be-heated object 112 from being heated or from being subjected to an accurate temperature control.

It is noted that whether or not only display 119a is placed on top plate 113 and whether or not display 119c and displays 119d, 119e, and 119f are provided on top plate 113 in FIG. 2A, FIG. 2B, and FIG. 2C may be appropriately determined depending on the case. To-be-heated object determination section 118a that senses the existence or nonexistence of to-be-heated object 112 on each display may be determined by appropriately selecting whether the function of to-be-heated object determination section 118a is provided to the respective sensors or not.

In FIG. 2A to FIG. 2C, when it is determined that to-be-heated object 112 does not exist above any of first sensor 115a and second sensors 115b, 115c, and 115d, controller 118a may provide a display or notification for prompting a user to cover display 119a, 119b, 119c, or 119d with to-be-heated object 112. This allows the user to more easily understand how to cope with a case where the heating of a to-be-heated object is limited because the to-be-heated object does not exist above any of first sensor 115a and second sensors 115b, 115c, and 115d, thus allowing the resultant induction heating device to be user-friendly.

Alternatively, controller 118a in FIG. 2C also may provide, when it is determined that to-be-heated object 112 does not exist above any of first sensor 115a and third sensors 115e and 115f, a display or notification for prompting the user to cover display 119a, display 119e or 119f with to-be-heated object 112. This allows the user to more easily understand how to cope with a case where the heating of a to-be-heated object is limited because the to-be-heated object is not located above any of the first sensor and the third sensor, thus allowing the resultant induction heating device to be user-friendly.

INDUSTRIAL APPLICABILITY

As described above, the induction heating device according to the present invention can provide an accurate sensing of the temperature of a to-be-heated object, thus providing a user with improved convenience. Furthermore, the configuration as described above can be applied to all applications using sensors having similar structures. Thus, the present invention has a very high industrial applicability.

The invention claimed is:

1. An induction heating device comprising:
a top plate that is provided on an upper face of a main body and adapted to have a to-be-heated object placed thereon;
a heating coil that is provided at a lower part of the top plate and that heats the to-be-heated object;
a plurality of sensors including a first sensor and at least one second sensor, each of the plurality of sensors being provided at the lower part of the top plate and sensing a temperature of the to-be-heated object;
at least one display unit including a first display unit, the first display unit being disposed on the top plate and showing a position of the first sensor;
a temperature calculator that calculates a temperature of a bottom face of the to-be-heated object based on an output from at least one of the plurality of sensors; a to-be-heated object determinatioin section that determines an absence of the to-be-heated object aboe the first sensor; and
a controller that controls a power outputted to the heating coil in accordance with an output from the temperature calculator,
wherein:
the first sensor is decentered from a center of the heating coil to a position closer to a front side of the main body of the induction heating device,
the first sensor is located at a position to sense a higher temperature of a part of the to-be-heated object, the higher temperature being higher than a temperature of a part of the to-be-heated object above the center of the heating coil,
only the first sensor of the plurality of sensors has a display unit that shows sensor position,
only one first display unit is provided for each heating coil, and
the controller limits the power outputted to the heating coil by reducing the power outputted to the heating coil or stopping the power from being outputted to the heating coil when the to-be-heated object determination section determines the absence of the to-be-heated object above the first sensor.

2. The induction heating device according to claim 1, wherein:
the top plate is made of infrared-transparent material, and
the first sensor is an infrared ray sensor for sensing an infrared ray that is emitted from the to-be-heated object and that is transmissive through the top plate.

3. The induction heating device according to claim 2, wherein:
the first display unit is illuminated by light from a lower side.

4. The induction heating device according to claim 2, wherein:
a neighborhood of the first display unit is illuminated by light from a lower side.

5. The induction heating device according to claim 1, wherein:
the top plate is made of infrared-transparent material, and
the first sensor is an infrared ray sensor for sensing an infrared ray that is emitted from the to-be-heated object and that is transmissive through the top plate, and is close to an inner-most circumference of the heating coil.

6. The induction heating device according to claim 5, wherein
the first sensor is decentered from the center of the heating coil in a direction that is perpendicular to the front side.

7. The induction heating device according to claim 1, wherein:
the heating coil is wound and is divided into an inner coil and an outer coil, and
the first sensor is provided between the inner coil and the outer coil.

8. The induction heating device according to claim 1, further comprising:
a heat sensitive element that is provided at the center of the heating coil,
wherein:
the temperature calculator calculates the temperature of the bottom face of the to-be-heated object based on an output from the heat sensitive element, and
the top plate does not have provided thereon a display unit showing a position of the heat sensitive element.

9. The induction heating device according to claim 8, wherein the heat sensitive element is a thermistor.

10. The induction heating device according to claim 1, wherein:
the at least one display unit also includes a text display provided on the top plate and indicating the existence of the first sensor in a vicinity of the first display unit.

11. The induction heating device according to claim 1, wherein:
the at least one display unit also includes a text display provided on the top plate for prompting a user to cover the first display unit showing the position of the first sensor with the to-be-heated object.

12. The induction heating device according to claim 1, wherein
the first sensor is decentered from the center of the heating coil in a direction that is perpendicular to the front side.

13. The induction heating device according to claim 1, wherein:

a position of the first display unit does not completely correspond to the position of the first sensor; and the position of the first display unit is decentered toward the front side on an auxiliary line that is perpendicular to the front side that passes through the center of the heating coil.

14. The induction heating device according to claim 1, wherein the controller provides a notification to cover the first display unit with the to-be-heated object when the to-be-heated object is not located above the first sensor, and the controller no longer limits the power outputted to the heating coil when the to-be-heated object is, subsequent to the notification, located above the first sensor.

15. An induction heating device comprising:

a top plate that is provided on an upper face of a main body and adapted to have a to-be-heated object placed thereon;

a heating coil for heating the to-be-heated object, the heating coil being provided at a lower part of the top plate, and being wound and divided into an inner coil and an outer coil;

a plurality of sensors for sensing a temperature of the to-be-heated object, the plurality of sensors being provided at the lower part of the top plate, and the plurality of sensors including a first sensor provided between the inner coil and the outer coil at the lower part of the top plate and at least one second sensor;

at least one display unit including a first display unit, the first display unit being disposed on the top plate and showing a position of the first sensor;

a temperature calculator for calculating a temperature of a bottom face of the to-be-heated object based on an output from at least one of the plurality of sensors; and a controller for controlling a power outputted to the heating coil in accordance with an output from the temperature calculator, wherein:

the first sensor is decentered from a center of the heating coil to a position closer to a front side of the main body of the induction heating device, only the first sensor of the plurality of sensors has a display unit that shows sensor position, only one first display unit is provided for each heating coil, and the controller limits the power outputted to the heating coil by reducing the power outputted to the heating coil or stopping the power from being outputted to the heating coil when the to-be-heated object is not located above the first sensor.

16. The induction heating device according to claim 15, wherein:

the top plate is made of infrared-transparent material, and the first sensor is an infrared ray sensor for sensing an infrared ray that is emitted from the to-be-heated object and that is transmissive through the top plate.

17. The induction heating device according to claim 16, wherein:

the first display unit is illuminated by light from a lower side.

18. The induction heating device according to claim 16, wherein:

a neighborhood of the first display unit is illuminated by light from a lower side.

19. The induction heating device according to claim 15, further comprising:

a heat sensitive element that is provided at the center of the heating coil, wherein:

the temperature calculator calculates the temperature of the bottom face of the to-be-heated object based on an output from the heat sensitive element, and the top plate does not have provided thereon a display unit showing a position of the heat sensitive element.

20. The induction heating device according to claim 19, wherein the heat sensitive element is a thermistor.

21. The induction heating device according to claim 15, wherein:

the at least one display unit also includes a text display provided on the top plate and indicating the existence of the first sensor in a vicinity of the first display unit.

22. The induction heating device according to claim 15, wherein:

the at least one display unit also includes a text display provided on the top plate for prompting a user to cover the first display unit showing the position of the first sensor with the to-be-heated object.

23. The induction heating device according to claim 15, wherein the first sensor is decentered from the center of the heating coil in a direction that is perpendicular to the front side.

24. The induction heating device according to claim 15, wherein:

a position of the first display unit does not completely correspond to the position of the first sensor; and the position of the first display unit is decentered toward the front side on an auxiliary line that is perpendicular to the front side that passes through the center of the heating coil.

25. The induction heating device according to claim 15, wherein the controller provides a notification to cover the first display unit with the to-be-heated object when the to-be-heated object is not located above the first sensor, and the controller no longer limits the power outputted to the heating coil when the to-be-heated object is, subsequent to the notification, located above the first sensor.

* * * * *